United States Patent [19]
Kall

[11] 3,950,156
[45] Apr. 13, 1976

[54] DEVICE FOR SEPARATING LIQUIDS FROM GASEOUS MEDIA

[75] Inventor: Horst Kall, Gummersbach, Germany

[73] Assignee: L. & C. Steinmüller GmbH, Gummersbach, Germany

[22] Filed: July 17, 1974

[21] Appl. No.: 489,154

[30] Foreign Application Priority Data
July 18, 1973   Germany............................ 2336447

[52] U.S. Cl..................................... 55/440; 55/443
[51] Int. Cl.².......................................... B01D 45/08
[58] Field of Search ............ 55/440, 442, 443, 444, 55/445, 446, 464, DIG. 37; 98/121 R

[56] References Cited
UNITED STATES PATENTS

| | | | |
|---|---|---|---|
| 2,157,305 | 5/1939 | Raymond............................. | 55/444 |
| 2,479,625 | 8/1949 | Kimmell............................... | 55/440 |
| 2,643,736 | 6/1953 | Smith................................... | 55/440 |
| 3,254,475 | 6/1966 | Farr et al. ......................... | 55/440 X |
| 3,405,511 | 10/1968 | Halter et al............................ | 55/440 |

FOREIGN PATENTS OR APPLICATIONS

| | | | |
|---|---|---|---|
| 222,778 | 6/1909 | Germany.............................. | 55/443 |
| 828,547 | 12/1969 | Canada................................. | 55/440 |
| 257,368 | 5/1912 | Germany.............................. | 55/440 |

*Primary Examiner*—Frank W. Lutter
*Assistant Examiner*—David L. Lacey
*Attorney, Agent, or Firm*—Walter Becker

[57] ABSTRACT

A means for separating liquids from a gaseous medium with undulated deviating elements which are arranged adjacent to each other in the direction of flow of the gaseous medium. These deviating elements within the region of their crests have catching troughs open in a direction counter to the direction of flow of the gaseous medium for the liquid to be separated from the latter. The catching troughs which, when looking in the direction of flow of the gaseous medium are located in the front region of the means, are within their inlet region each provided with a front and a rear confinement with the front confinement being overlapped by the rear confinement, the catching troughs located in the rear region of the means being free from confinements overlapping each other. The rear confinements of at least a part of said catching troughs lead into a groove followed by the closed confinement of the next following catching trough.

4 Claims, 2 Drawing Figures

DEVICE FOR SEPARATING LIQUIDS FROM GASEOUS MEDIA

The present invention relates to a device for separating liquids from a gaseous medium which device is provided with undulated reversing elements located in flow direction adjacent to each other. These reversing elements within the region of their crown area have catching or collecting troughs for the liquid to be separated, said catching troughs being open in a direction counter to the flow direction of the gaseous medium. The catching troughs which when viewed in flow direction are located in the front region of the device have in their inlet region one front and one rear confinement each. The front confinement is overlapped by the rear confinement while the catching troughs located in the rear region of the device are designed without confinement overlapping each other.

The utilization of two catching troughs of a special shape which act as confinements overlapping each other and other single troughs which act as as confinements overlapping each other serve the purpose to separate as much liquid as possible from the gaseous medium on its flow path. Numerous tests have shown that liquid is dragged to the rear confinements of the catching troughs and upon these confinements, there are acting such large dragging forces of the flow that liquid is separated thereby considerably later than desired.

It is, therefore, an object of the present invention so to design the reversing elements equipped with catching troughs that the liquid, which is not caught by the catching troughs but passes onto the rear confinements of the catching troughs, can quickly be withdrawn from the dragging force of the flow and thus can be separated.

This object and other objects and advantages of the invention will appear more clearly from the following specification in connection with the accompanying drawings, in which.

The device according to the present invention is characterized primarily in that the rear confinements of at least one portion of the catching troughs lead into a groove having arranged thereon the closed confinement of the next following catching trough.

It will be appreciated that within the region of the groove a dead water area forms in which the dragging forces of the flow act upon the liquid only slightly so that the force of gravity prevails and brings about a flowing off of the liquid within the groove. Since the groove is located in a region where primarily a parallel flow prevails, the latter will not be materially influenced.

Figure 1:
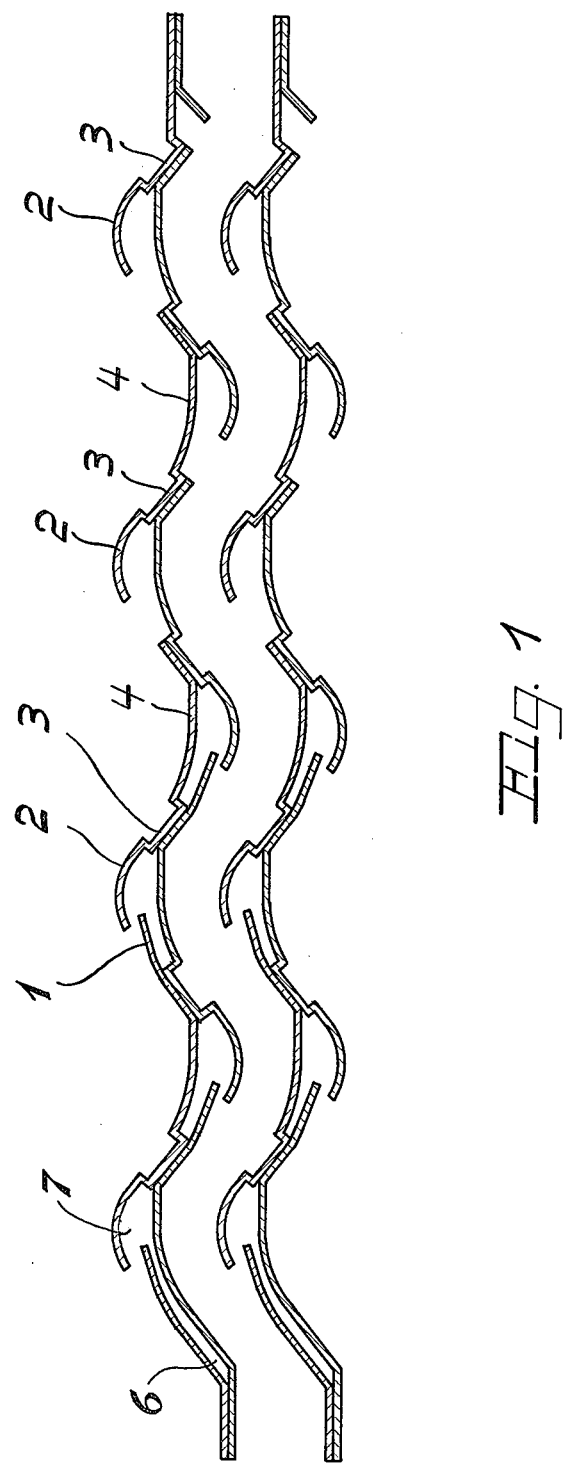
FIG. 1 shows a first embodiment of the device according to the invention.
Figure 2:
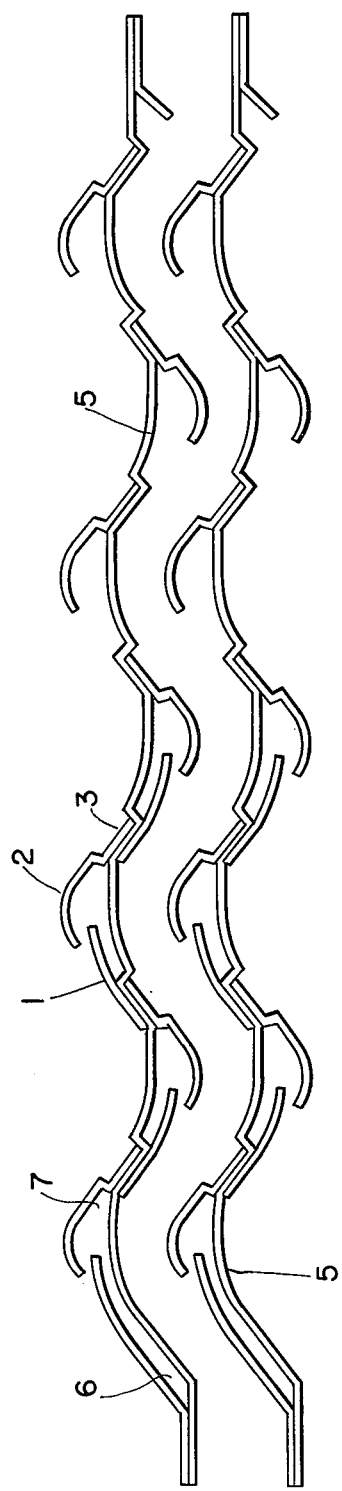
FIG. 2 is a modification of the device of FIG. 1.

Referring now to the drawings in detail, the individual elements of the separating device consist of individual profiles on a weblike structure 4 which in conformity with FIG. 1 are so welded to each other, cemented to each other, riveted to each other, screwed to each other, or, according to FIG. 2 are so connected to a continuous supporting member or central plate 5 as support in any of the above mentioned ways that flow passages are formed with alternating deviations and catching troughs collectively with the separating device for conducting away the separated liquid.

The profiles in the front portion of the separating device according to FIG. 1 are so shaped that catching troughs are formed with confinements or flanges 1 and 2 which overlap each other. Tests have proved that these catching troughs 6 and 7 formed by confinements 1 and 2 can conduct away an optimum large flow of liquid. Behind the curvature of the rear confinement 2 at its rear edge the profiles 4 have a groove 3. This groove 3 independently of the type of separator with or without intermediate support plate 5, will permit matching or adapting of the cross section of the catching troughs to the respective problems of the separating device with regard to the quantity of liquid to be separated. Moreover, in this way a further open trough is formed in which liquid can flow off which did not pass into the trough located ahead of groove 3 when looking in the direction of flow of the gas but was dragged by the said flow beyond the inlet gap of said catching trough which inlet gap is formed by the overlapping front and rear confinements 1 and 2.

In the rear portion of the separator, in particular those droplets are separated which in the front portion were pulled out of the film formed by the liquid. These droplets adhere to the walls of the separator elements. Since in most instances of application, the dragging force of the flow is greater than the force of gravity, the droplets adhering to the walls are dragged so far along in the flow direction until they pass into flow-dead zones; the droplets are here received by the forming channels or combine with other droplets until the force of adherence thereof is overcome by the force of gravity. The above mentioned grooves 3 form such flow-dead zones and such zones are also formed by the catching troughs arranged in the rear portion of the separating device, without confinements overlapping each other.

It is, of course, to be understood that the present invention is, by no means, limited to the specific showing in the drawings but also comprises any modifications within the scope of the appended claims.

What I claim is:

1. Means for separating liquids from a gaseous medium which includes a plurality of longitudinal sinuous substantially web-like structures each having front and rear ends and in which said liquids and gaseous medium flow from the front toward the rear ends of said structures, each said web-like structure being formed with successive crests and valleys transverse to the longitudinal direction of said web-like structure, the crests and valleys on one side having corresponding complementary valleys and crests on the opposite side, said crests on both sides having first catching troughs open in a direction facing the front end of said means and constituting confinements formed by first transverse flanges fixed at their rear sides to said web-like structure and spaced from said web-like structure at their open, front sides which face the front end of said web-like structure, said web-like structure at its front end having other transverse troughs opening in the direction opposite that of said first troughs and constituting other confinements formed by second transverse flanges fixed at their front sides to said web-like structure in front of said crests and spaced from said web-like structure at their rear sides and projecting toward said first flanges with said first flanges overlapping said second flanges, said first flanges at their rear sides merging into transverse grooves on the rear sides of the crests having said transverse flanges, and being offset from said crests.

2. Means as claimed in claim 1, in which said structures are vertically spaced.

3. Means as claimed in claim 1, in which each web-like structure consists of individual elements connected to each other.

4. Means as claimed in claim 1, in which each web-like structure comprises a continuous supporting member extending over the length of said means and having an undulated contour, and said flanges are formed by additional elements connected to said supporting member.

* * * * *